United States Patent
Nishikawa

(10) Patent No.: US 10,268,559 B2
(45) Date of Patent: Apr. 23, 2019

(54) TRANSMISSION OF LOG INFORMATION FOR DEVICE MAINTENANCE TO A MOBILE COMPUTING DEVICE

(71) Applicant: TOSHIBA TEC KABUSHIKI KAISHA, Tokyo (JP)

(72) Inventor: Hiroshi Nishikawa, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 15/250,789

(22) Filed: Aug. 29, 2016

(65) Prior Publication Data

US 2017/0091062 A1 Mar. 30, 2017

(30) Foreign Application Priority Data

Sep. 29, 2015 (JP) .................................. 2015-192039

(51) Int. Cl.
*H04L 12/24* (2006.01)
*G06F 11/30* (2006.01)
(Continued)

(52) U.S. Cl.
CPC ........ *G06F 11/3065* (2013.01); *G06F 11/302* (2013.01); *G06F 11/3013* (2013.01);
(Continued)

(58) Field of Classification Search
CPC .... H04B 17/318; H04W 76/10; H04W 12/06; H04W 36/30; H04W 76/14; H04W 84/12; G06F 11/3495; G06F 11/3065; G06F 11/3055; G06F 11/302; G06F 11/3013; G06F 11/3476; H04L 67/06;
(Continued)

(56) References Cited

U.S. PATENT DOCUMENTS 9,462,630 B2 * 10/2016 Murray ................. H04W 84/18
2005/0247775 A1 * 11/2005 Gloekler ................. G01S 19/42
235/375

(Continued)

FOREIGN PATENT DOCUMENTS

| JP | 2009110318 A | 5/2009 |
|---|---|---|
| JP | 2011118610 A | 6/2011 |
| JP | 2014127014 A | 7/2014 |
| JP | 2014149676 A | 8/2014 |

OTHER PUBLICATIONS

Japanese Office Action dated Mar. 22, 2018, filed in Japanese counterpart Application No. 2015-192039, 6 pages (with translation).

*Primary Examiner* — Oanh Duong
(74) *Attorney, Agent, or Firm* — Kim & Stewart LLP

(57) ABSTRACT

A computing device includes a memory, a communication interface, and a controller. The controller is configured to store, in the memory, one or more logs that meet a predetermined condition, during operation of the computer device, detect establishment of a local wireless or wired connection to a mobile computing device, detect a triggering event to trigger an output of said one or more logs stored in the memory, and upon detection of the triggering event, control the communication interface to transmit said one or more logs stored in the memory to the mobile computing device.

20 Claims, 10 Drawing Sheets

(51) Int. Cl.
　　　H04B 17/318　　(2015.01)
　　　G06F 11/34　　(2006.01)
　　　H04L 29/08　　(2006.01)
　　　H04L 29/06　　(2006.01)
　　　H04W 12/06　　(2009.01)
　　　H04W 36/30　　(2009.01)
　　　H04L 29/14　　(2006.01)
　　　H04W 76/14　　(2018.01)
　　　H04W 76/10　　(2018.01)
　　　H04W 84/12　　(2009.01)
(52) U.S. Cl.
　　　CPC ...... *G06F 11/3055* (2013.01); *G06F 11/3476* (2013.01); *G06F 11/3495* (2013.01); *H04B 17/318* (2015.01); *H04L 41/069* (2013.01); *H04L 41/0654* (2013.01); *H04L 63/083* (2013.01); *H04L 67/06* (2013.01); *H04L 69/40* (2013.01); *H04W 12/06* (2013.01); *H04W 36/30* (2013.01); *H04W 76/10* (2018.02); *H04W 76/14* (2018.02); *H04W 84/12* (2013.01)

(58) Field of Classification Search
　　　CPC ... H04L 41/0654; H04L 63/083; H04L 69/40; H04L 41/069
　　　See application file for complete search history.

(56) References Cited

U.S. PATENT DOCUMENTS

| | | | | |
|---|---|---|---|---|
| 2014/0258251 | A1* | 9/2014 | Bestgen | G06F 17/30442 707/696 |
| 2015/0089271 | A1* | 3/2015 | Shimizu | G06F 12/0292 714/4.1 |
| 2015/0245229 | A1* | 8/2015 | Gu | H04L 41/0668 455/419 |
| 2015/0281037 | A1* | 10/2015 | Ishihara | H04L 41/069 709/224 |
| 2016/0085638 | A1* | 3/2016 | Mizutani | H04L 43/04 714/19 |
| 2016/0189440 | A1* | 6/2016 | Cattone | G07C 5/008 701/31.5 |

* cited by examiner

| MONITORING TARGET LOG | COLLECTION CONDITION | COLLECTION CONDITION | ... |
|---|---|---|---|
| AAA.log | Error | Warning | ... |
| BBB.log | Violation | – | ... |
| ⋮ | ⋮ | ⋮ | ⋮ |

| MONITORING TARGET LOG | COLLECTION CONDITION | COLLECTION TARGET PERIOD | COLLECTION TARGET LOG | COLLECTION TARGET LOG | ... |
|---|---|---|---|---|---|
| AAA.log | Error | ONE HOUR | XXX.log | YYY.log | ... |
| AAA.log | Warning | ONE DAY | YYY.log | ZZZ.log | ... |
| ⋮ | ⋮ | ⋮ | ⋮ | ⋮ | ⋮ |

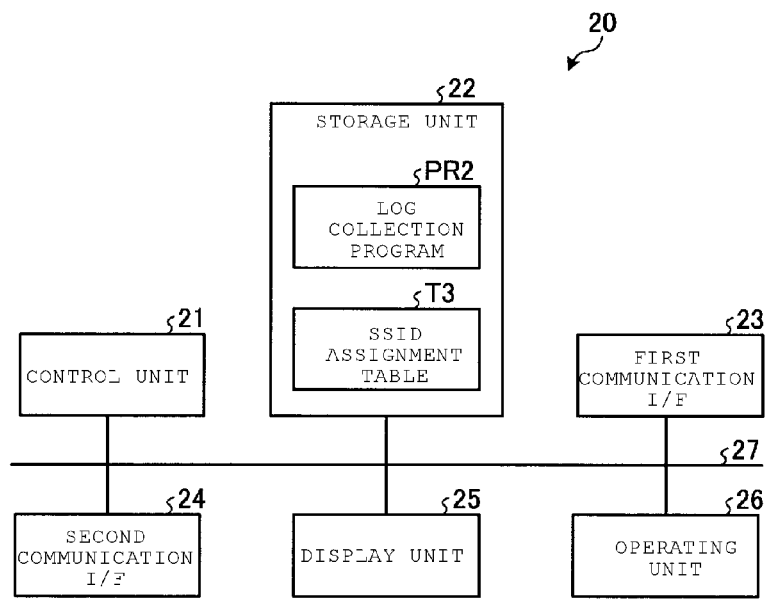

TRANSMISSION OF LOG INFORMATION FOR DEVICE MAINTENANCE TO A MOBILE COMPUTING DEVICE

CROSS-REFERENCE TO RELATED APPLICATION

This application is based upon and claims the benefit of priority from Japanese Patent Application No. 2015-192039, filed Sep. 29, 2015, the entire contents of which are incorporated herein by reference.

FIELD

Embodiments described herein relate generally to a computing device and a method for transmitting log information for device maintenance thereof.

BACKGROUND

Merchandise sales data are typically managed in a retail store such as a supermarket using a point of sales (POS) terminal. A manager of the retail store, in a case where a failure and the like occur in the POS terminal, contacts a serviceperson to fix the failure. Then, the serviceperson visits the store and collects logs in order to analyze the cause of the failure that has occurred in the POS terminal.

However, there are various kinds of failures that can occur in the POS terminal. For that reason, the serviceperson may fail to collect logs that are necessary to be analyzed to fix the failure. In this case, the serviceperson may have to revisit the store in order to collect the necessary log, thereby wasting much time and effort.

DESCRIPTION OF THE DRAWINGS

FIG. 3 illustrates an example of a collection condition table.

FIG. 4 illustrates an example of a collected log table.

FIG. 5 is a block diagram of a store server in the apparatus management system.

FIG. 6 illustrates an example of an SSID assignment table.

DETAILED DESCRIPTION

An embodiment provides an information processing apparatus and a program that can prevent failure of collecting a log required for analysis.

In general, according to an embodiment, a computing device includes a memory, a communication interface, and a controller. The controller is configured to store, in the memory, one or more logs that meet a predetermined condition, during operation of the computer device, detect establishment of a local wireless or wired connection to a mobile computing device, detect a triggering event to trigger an output of said one or more logs stored in the memory, and upon detection of the triggering event, control the communication interface to transmit said one or more logs stored in the memory to the mobile computing device.

Hereinafter, an embodiment of an information processing apparatus and a program will be described in detail with reference to the accompanied drawings. The embodiment described below is one embodiment of the information processing apparatus and the program, and a configuration, specification, and the like are not limited to the following embodiment. The present embodiment is an example applied to a point of sales (POS) system that is introduced in a store such as a supermarket and performs merchandise sales data processing related to registration and payment of merchandise items in one transaction.

Figure 1:
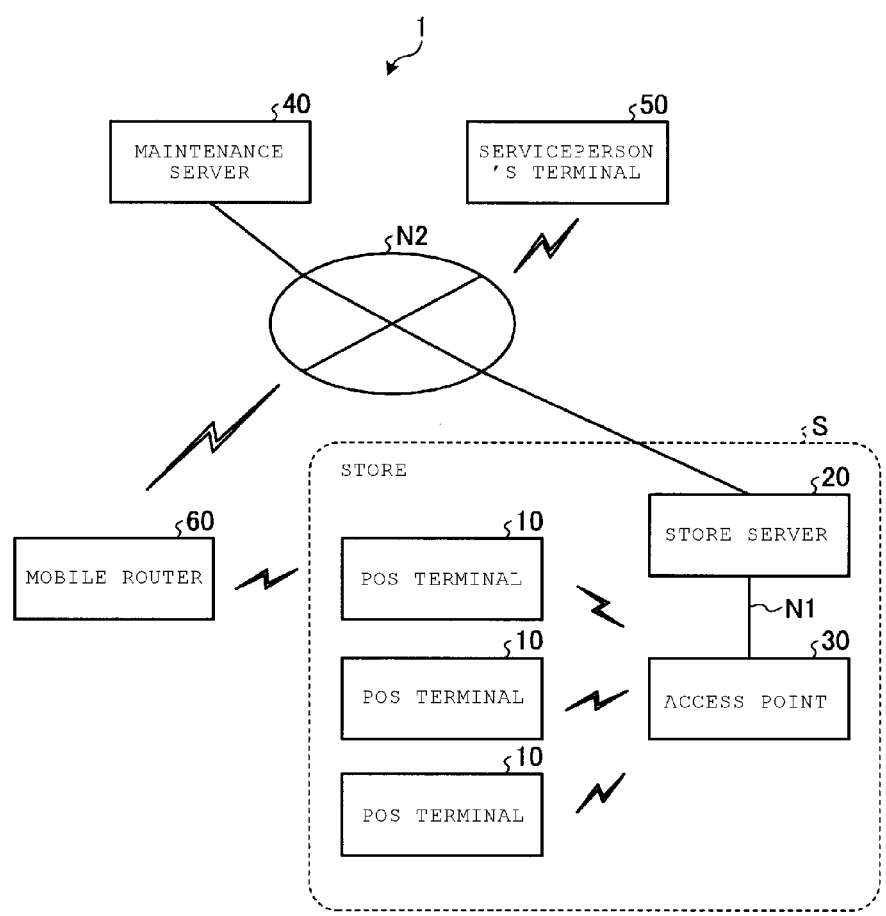
FIG. 1 illustrates an apparatus management system according to an embodiment.

FIG. 1 illustrates a configuration of an apparatus management system 1 according to the present embodiment. The apparatus management system 1 includes a POS terminal (terminal device) 10, a store server (local device) 20, an access point 30, a maintenance server 40, a serviceperson's terminal 50, and a mobile router 60.

The POS terminal 10, the store server 20, and the access point 30 serve as a POS system and are located in a store S. The POS terminal 10 is an information processing apparatus that is used for the merchandise sales data processing in the store S such as a supermarket. The store server 20 is used to manage the POS terminal 10 located in the store S. The access point 30 is an apparatus that receives a connection request from the POS terminal 10 or the store server 20 and operates as a relay for connection to an in-store network N1.

The in-store network N1 is a network (intra network) to which each apparatus located in the store S is connected. The POS terminal 10 is connected to the access point 30 via a wireless local area network (LAN) and the like. The access point 30 is connected to the store server 20 via a wired LAN and the like. That is, the POS terminal 10 and the store server 20 are connected to the in-store network N1 via the access point 30 to send and receive information with each other.

The store server 20, the maintenance server 40, the serviceperson's terminal 50, and the mobile router 60 are connected to a network N2 to send and receive information with each other. The network N2 is a dedicated line such as an Internet virtual private network (VPN).

The maintenance server 40 is, for example, a server apparatus that is located in a support center. The support center supports setting of the POS terminal 10 and receives requests for repair and the like. Various kinds of information are registered in the maintenance server 40 when a serviceperson who provides maintenance of the POS terminal 10 visits the store S. The maintenance server 40 is used for, for example, analyzing logs of the POS terminal 10 that experienced a failure.

The serviceperson's terminal 50 is a personal computer or the like used by the serviceperson who performs maintenance of the POS terminal 10. The serviceperson's terminal 50 is not limited to a personal computer and may be a notebook personal computer, a tablet terminal, a smartphone, or the like. The serviceperson uses the serviceperson's terminal 50 in order to input various information in the maintenance server 40 when, for example, visiting the store S.

The mobile router 60 is a portable wireless LAN router. More specifically, the mobile router 60 includes at least two communication interfaces (I/Fs). One communication I/F communicates with the POS terminal 10 using a wireless LAN standard such as Wi-Fi (Wireless Fidelity). The mobile router 60 can establish connection based no the Wi-Fi standard. The other communication I/F communicates with the network N2 using, for example, the third generation (3G) mobile telecommunications standard defined in International Mobile Telecommunications-2000 (IMT-2000) or a wireless WAN communication standard such as Long-Term Evolution (LTE) and Worldwide Interoperability for Microwave Access (WiMAX). Accordingly, the mobile router 60 operates as a relay for connection between various apparatuses and the network N2. The serviceperson brings the mobile router 60 when visiting the store S, so that the mobile router 60 can connect the POS terminal 10 to the network N2.

Next, details of various apparatuses included in the apparatus management system 1 will be described.

Figure 2:
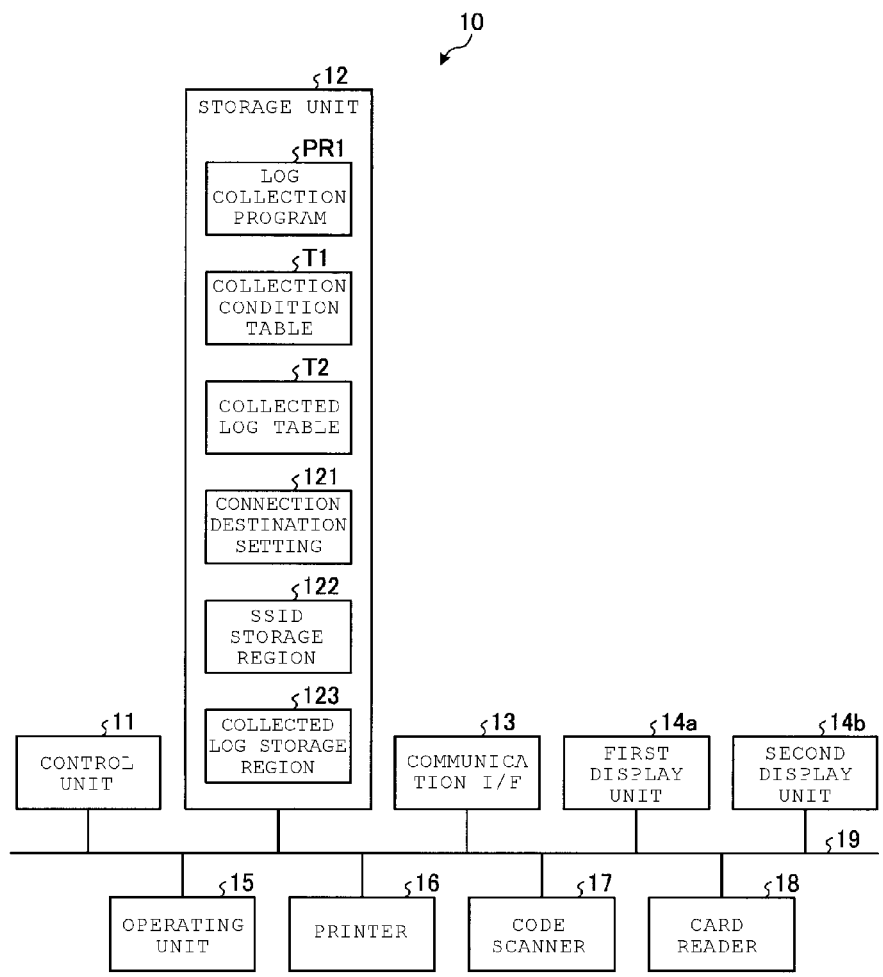
FIG. 2 is a block diagram of a POS terminal in the apparatus management system.

First, a configuration of the POS terminal 10 will be described. FIG. 2 is a block diagram of the POS terminal 10.

As illustrated in FIG. 2, the POS terminal 10 includes a control unit 11 that controls various calculations and each unit of the POS terminal 10. The control unit 11 includes a central processing unit (CPU), a read-only memory (ROM), a random access memory (RAM), a real-time clock (RTC), and the like. The CPU controls operation of the POS terminal 10. The ROM is a storage medium that stores various programs and data. The RAM is a storage medium that temporarily stores various programs or in which various data are rewritten. The RTC indicates the current date and time.

The control unit 11 is connected through a bus 19 to a storage unit 12, a communication I/F 13, a first display unit 14*a*, a second display unit 14*b*, an operating unit 15, a printer 16, a code scanner 17, and a card reader 18.

The storage unit 12 is a storage device such as a hard disk drive (HDD) or a solid state drive (SSD). The storage unit 12 stores a program for performing various kinds of processing including the merchandise sales data processing and stores various setting information. Specifically, the storage unit 12 stores a log collection program PR1, a collection condition table T1, a collected log table T2, a connection destination setting 121, a service set identifier (SSID) storage region 122, and a collected log storage region 123.

The log collection program PR1 exhibits a characteristic function of the POS terminal 10.

The collection condition table T1 indicates conditions for collecting logs of the POS terminal 10. FIG. 3 illustrates an example of the collection condition table T1. The collection condition table T1 stores one or a plurality of log collection conditions in association with each monitoring target log. The monitoring target log (first log) indicates a log targeted for monitoring. More specifically, the monitoring target log indicates, for example, a log file name of a log targeted for monitoring and a destination where the log file is stored. Character strings "AAA.log", "BBB.log", and the like as monitoring target logs are registered in the collection condition table T1 illustrated in FIG. 3. The collection condition is information that corresponds to a condition for collecting a log. The collection condition is information such as a character string that is defined as a condition for collecting a log. There may be one or a plurality of the collection conditions. Character strings "Error" and "Warning" as collection conditions that indicate occurrence of a failure are registered in the collection condition table T1 illustrated in FIG. 3 in correlation with "AAA.log". A character string "Violation" as a collection condition that indicates occurrence of a failure is registered in the collection condition table T1 in correlation with "BBB.log".

The collected log table T2 contains logs collected in association with each collection condition of each monitoring target log. FIG. 4 illustrates one example of the collected log table T2. The collected log table T2 stores a collection target period and one or a plurality of collection target logs in association with each monitoring target log and each collection condition, which are same as those in the collection condition table T1. The collection target period is a period in which the collection target logs are collected. That is, the collection target log that is output within the collection target period in a case where a defined character string is detected in the monitoring target log is collected. The collection target log indicates a log targeted for collection in a case where a character string defined as a collection condition is detected in the monitoring target log. More specifically, the collection target log indicates, for example, a log file name of a log targeted for collection and a destination where the log file is stored. Hereinafter, a character string that is defined as a condition for collecting a log will be referred to as a defined character string.

A character string "one hour" as a collection target period and character strings "XXX.log" and "YYY.log" as collection target logs are registered in the collected log table T2 illustrated in FIG. 4 in association with "AAA.log" and "Error". This case indicates that "XXX.log" and "YYY.log" that are output within "one hour" in a case where "Error" is detected from "AAA.log". A character string "one day" as a collection target period and character strings "YYY.log" and "ZZZ.log" as collection target logs are registered in the collected log table T2 in correlation with "AAA.log" and "Warning". This case indicates that "YYY.log" and "ZZZ.log" that are output within "one day" in a case where "Warning" is detected from "AAA.log". The collected log table T2 may include the collection target period for each collection target log. Accordingly, more appropriate logs can be collected.

The connection destination setting 121 is a setting that indicates a connection destination to which the POS terminal 10 is connected, such as the access point 30 or the mobile router 60. That is, an SSID (device ID) that indicates a connection destination apparatus is set in the connection destination setting 121. The SSID is apparatus identification information of an apparatus that operates as a relay for connection to the in-store network N1 or the network N2.

The SSID storage region 122 is a storage region that stores the SSID of the mobile router 60 carried by the serviceperson.

The collected log storage region 123 stores the collected collection target logs.

The communication I/F 13 is connected to the in-store network N1 via the access point 30. The communication I/F 13 is also connected to the network N2 via the mobile router 60. More specifically, the communication I/F 13 communicates with the access point 30 or the mobile router 60 using a wireless LAN standard such as Wi-Fi. A determination of which connection destination of the access point 30 and the mobile router 60 is to be connected to the communication I/F 13 is such that the communication I/F 13 depends on the connection destination designated by the connection destination setting 121.

The first display unit 14*a* and the second display unit 14*b* are display devices such as liquid crystal displays. The first display unit 14*a* and the second display unit 14*b* display various kinds of information such as the name and the price of a merchandise item registered by the merchandise sales data processing and the total amount and the change amount in one transaction. The first display unit 14a displays various kinds of information to a cashier. The second display unit 14b displays various kinds of information mainly to a customer. The first display unit 14a and the second display unit 14b may include touch panels. In this case, the touch panels function as the operating unit 15.

The operating unit 15 includes various operating keys for operation by an operator. Specifically, the operating unit 15 includes operating keys such as numeric keys for input of numeric values, a cursor key and a selection determination key for selecting a predetermined item, and a subtotal key that generates an instruction to output the total amount for merchandise items.

The printer 16 is a printing device that prints a receipt, a journal, and the like. The printer 16 prints receipt information on a sheet such as a paper roll and outputs a paper receipt. The code scanner 17 optically reads code symbols such as a barcode and a two-dimensional code. The card reader 18 reads information recorded in a card medium.

Next, a configuration of the store server 20 will be described. FIG. 5 is a block diagram illustrating a configuration of the store server 20.

As illustrated in FIG. 5, the store server 20 includes a control unit 21 that controls various calculations and each unit of the store server 20. The control unit 21 includes a CPU, a ROM, a RAM, an RTC, and the like. The CPU controls operation of the store server 20. The ROM stores various programs and data. The RAM temporarily stores various programs or in which various kinds of data are rewritten. The RTC indicates the current date and time.

The control unit 21 is connected through a bus 27 to a storage unit 22, a first communication I/F 23, a second communication I/F 24, a display unit 25, and an operating unit 26.

The storage unit 22 is a storage device such as an HDD or an SSD. The storage unit 22 stores a program for performing management tasks and stores various kinds of setting information. Specifically, the storage unit 22 stores a log collection program PR2 and an SSID assignment table T3.

The log collection program PR2 is a program for performing a function of the store server 20.

The SSID assignment table T3 stores the SSIDs of the access point 30 assigned to each POS terminal 10 located in the store S. FIG. 6 illustrates one example of the SSID assignment table T3. The SSID assignment table T3 stores POS terminal identification information in correlation with an SSID. The POS terminal identification information allows identification of the POS terminal 10 located in the store S. The SSID is one of the SSIDs of the access point 30 located in the store S.

The first communication I/F 23 is connected to the in-store network N1 via the access point 30. More specifically, the first communication I/F 23 communicates with the in-store network N1 using a communication standard such as a wired LAN. The second communication I/F 24 is connected to the network N2. More specifically, the second communication I/F 24 communicates with the network N2 using a standard such as an Internet VPN.

The display unit 25 is a display device such as a liquid crystal display. The operating unit 26 is a keyboard, a mouse, or the like for operation by the operator.

Figure 7:
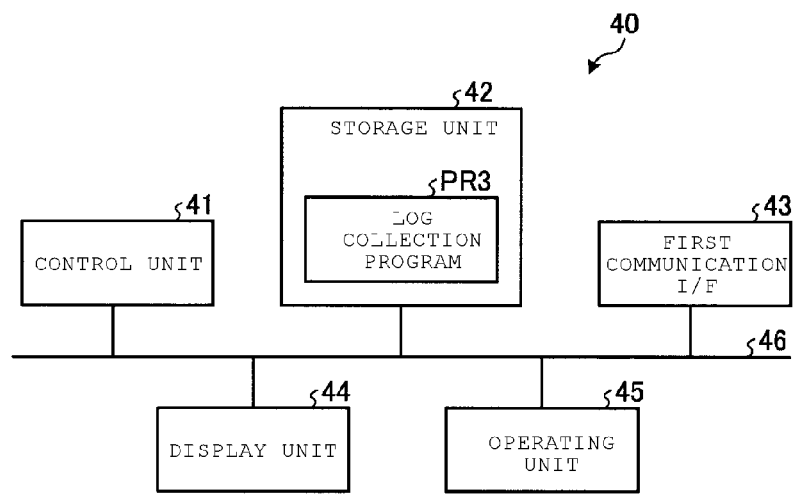
FIG. 7 is a block diagram illustrating a hardware configuration of a maintenance server.

Next, a configuration of the maintenance server 40 will be described. FIG. 7 is a block diagram illustrating a configuration of the maintenance server 40.

As illustrated in FIG. 7, the maintenance server 40 includes a control unit 41 that controls various calculations and each unit of the maintenance server 40. The control unit 41 includes a CPU, a ROM, a RAM, an RTC, and the like. The CPU controls operation of the maintenance server 40. The ROM stores various programs and data. The RAM temporarily stores various programs or in which various data are rewritten. The RTC indicates the current date and time.

The control unit 41 is connected through a bus 46 to a storage unit 42, a first communication I/F 43, a display unit 44, and an operating unit 45.

The storage unit 42 is a storage device such as an HDD or an SSD. The storage unit 42 stores a program for performing management tasks and stores various kinds of setting information. Specifically, the storage unit 42 stores a log collection program PR3.

The log collection program PR3 is a program for performing a function of the maintenance server 40.

The first communication I/F 43 is connected to the network N2. More specifically, the first communication I/F 43 communicates with the network N2 according to a standard such as an Internet VPN.

The display unit 44 is a display device such as a liquid crystal display. The operating unit 45 is a keyboard, a mouse, or the like for operation by the operator.

Figure 8:
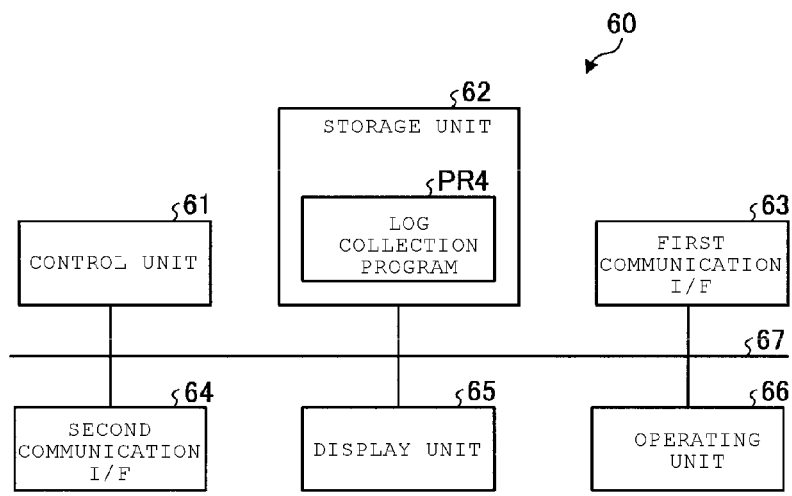
FIG. 8 is a block diagram of a mobile router in the apparatus management system.

Next, a configuration of the mobile router 60 will be described. FIG. 8 is a block diagram illustrating a configuration of the mobile router 60.

As illustrated in FIG. 8, the mobile router 60 includes a control unit 61 that controls various calculations and each unit of the mobile router 60. The control unit 61 includes a CPU, a ROM, a RAM, an RTC, and the like. The CPU controls operation of the mobile router 60. The ROM stores various programs and data. The RAM temporarily stores various programs or in which various data are rewritten. The RTC indicates the current date and time.

The control unit 61 is connected through a bus 67 to a storage unit 62, a first communication I/F 63, a second communication I/F 64, a display unit 65, and an operating unit 66.

The storage unit 62 is a storage device such as an HDD or an SSD. The storage unit 62 stores a program for connection to the network N2 or the POS terminal 10 and stores various kinds of setting information. Specifically, the storage unit 62 stores a log collection program PR4. The log collection program PR4 is a program for performing a function of the mobile router 60.

The first communication I/F 63 is connected to the network N2. More specifically, the first communication I/F 63 communicates with the network N2 according to the 3G standard defined in IMT-2000 or a wireless WAN standard such as LTE or WiMAX. The second communication I/F 64 is connected to the POS terminal 10. More specifically, the second communication I/F 64 communicates with the POS terminal 10 using a wireless LAN standard such as Wi-Fi (Wireless Fidelity).

The display unit 65 is a display device such as a liquid crystal display. The operating unit 66 is a button or the like for operation by the serviceperson.

Figure 9:
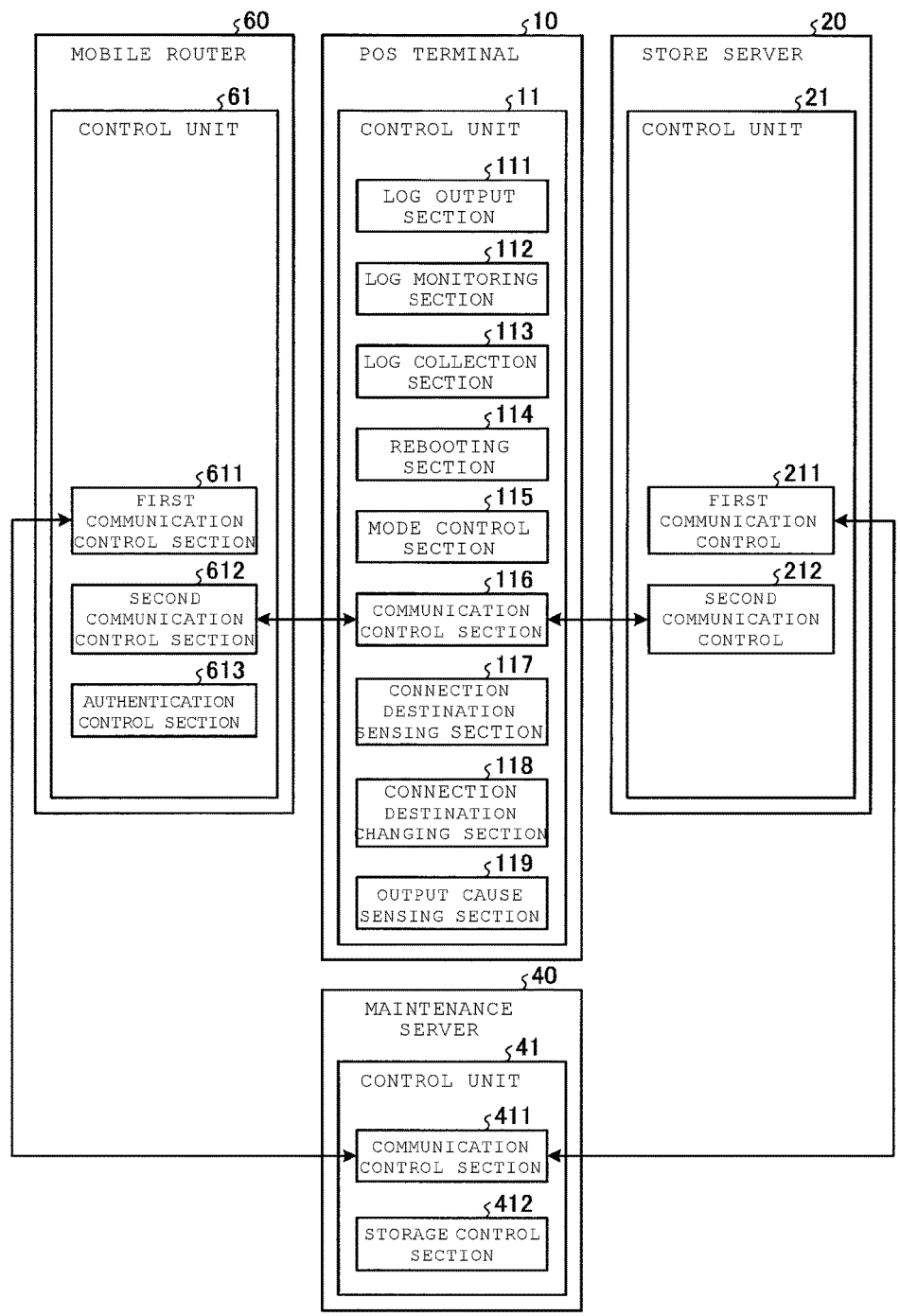
FIG. 9 is a block diagram illustrating functional sections of each apparatus in the apparatus management system.

Next, functions of each apparatus of the apparatus management system 1 will be described. FIG. 9 is a block diagram illustrating functional sections included in each apparatus of the apparatus management system 1.

First, functional sections of the POS terminal 10 will be described.

The CPU of the control unit 11 loads the log collection program PR1 of the storage unit 12 into the RAM and operates in accordance with the log collection program PR1, thereby generating each functional section illustrated in FIG. 9 on the RAM. Specifically, the control unit 11 includes, as the functional section, a log output section 111, a log monitoring section 112, a log collection section 113, a rebooting section 114, a mode control section 115, a communication control section 116, a connection destination sensing section 117, a connection destination changing section 118, and an output cause sensing section 119.

The log output section 111 outputs logs of processes performed by the POS terminal 10 to the storage unit 12. The log output section 111 outputs, for example, a log related to the merchandise sales data processing performed by the POS terminal 10 to the storage unit 12. The log output section 111 outputs logs related to processes performed by an operating system (OS), middleware, and application software to the storage unit 12. Logs output by the log output section 111 are not limited thereto and may be any type of log. The log output section 111 outputs the logs as a log file. The format of the log file may be of any type.

The log monitoring section 112 monitors the log output by the log output section 111. Accordingly, the log monitoring section 112, which is a detection section, detects one or a plurality of units of information corresponding to a predetermined condition from a predetermined monitoring target log. Specifically, the log monitoring section 112, which is a detection section monitors whether or not one or more predetermined character strings set in the collection condition table T1 is detected from each monitoring target log set in the collection condition table T1.

The log collection section 113, which is a collection section, collects a second log that is one or a plurality of collection target logs if the log monitoring section 112 determines that the predetermined character string is detected in the monitoring target log. Specifically, the log collection section 113 collects collection target logs based on the collected log table T2 in which one or a plurality of collection target logs is correlated with a monitoring target log and a defined character string. At this point, the log collection section 113 collects a collection target log output within a collection period, in the collected log table T2, with a monitoring target log and the predetermined character string detected by the log monitoring section 112. The log collection section 113 may collect the entirety of the log file of the collection target log output within the collection period. The log collection section 113 may collect a portion of the log file of the collection target log, output within the collection period.

The log collection section 113 that separately stores a collection target log in the collected log storage region 123 each time the log monitoring section 112 detects the predetermined character string. That is, the log collection section 113 stores a collection target log in the collected log storage region 123 for each detection date and time when the log monitoring section 112 detects the predetermined character string. The log collection section 113, for example, stores in the collected log storage region 123 one or more collection target logs by linking and combining the collection target logs into one file each time the log monitoring section 112 detects the predetermined character string. The log collection section 113 stores, in the collected log storage region 123, one or more collection target logs by placing the collection target logs in one directory each time the log monitoring section 112 detects the predetermined character string. Since the log collection section 113 combines collection target logs, the effort of the serviceperson when collecting logs can be reduced.

The rebooting section 114 reboots the POS terminal 10 when the log monitoring section 112 detects the predetermined character string in the monitoring target log. Accordingly, the rebooting section 114 can restore the POS terminal 10, for example, when the POS terminal 10 is hung by a failure and the like.

The mode control section 115 controls switching of the mode of the POS terminal 10. The mode control unit 115 that is a control section changes the mode of the POS terminal 10 to a maintenance mode when the log monitoring section 112 detects the predetermined character string from a monitoring target log and collects a collection target log. The mode control section 115 changes the mode of the POS terminal 10 to a normal mode when the maintenance is ended. In the maintenance mode, the mobile router 60 carried by the serviceperson is searched for in order for the serviceperson to provide maintenance on the POS terminal 10. Specifically, in the maintenance mode, the mobile router 60 sending a packet having the same SSID as the SSID stored in the SSID storage region 122 is searched for. In the normal mode, communication with the in-store network N1 is performed via the access point 30.

The communication control section 116 controls communication to an apparatus that is set as a connection destination in the connection destination setting 121. That is, the communication control section 116, according to the setting of the connection destination setting 121, controls communication to the in-store network N1 via the access point 30 that is a first connection destination or communication to the network N2 via the mobile router 60 that is a second connection destination.

Specifically, the communication control section 116 sends a detection notification indicating that a detection is made to the store server 20 when the log monitoring section 112 detects the predetermined character string in a monitoring target log. The detection notification includes the POS terminal identification information that allows identification of the POS terminal 10. Since the POS terminal identification information of the POS terminal 10 indicates the POS terminal 10 itself, the store server 20 recognizes which POS terminal 10 located in the store S detected the predetermined character string.

The communication control section 116 receives the SSID of the mobile router 60 carried by the serviceperson from the store server 20. The communication control section 116 stores the received SSID in the SSID storage region 122.

The communication control section 116, in a case where the connection destination setting 121 is changed to the SSID of the mobile router 60, controls communication to the mobile router 60, which is the changed connection destination. The communication control section 116 that is an output section sends a collection target log stored in the collected log storage region 123 to the maintenance server 40 via the mobile router 60 when the output cause sensing unit 119 senses the cause that trigger the output of the collection target log. At this point, the communication control section 116 sends all collection target logs stored in the collected log storage region 123 to the maintenance server 40 if a plurality of collection target logs is stored in the collected log storage region 123. Accordingly, the communication control section 116 can prevent failure to send the collection target log.

The connection destination sensing section 117 in the maintenance mode senses the mobile router 60 entering a predetermined area. In the predetermined area, the strength of electromagnetic waves transmitting the SSID sent by the mobile router 60 is greater than or equal to a threshold. The threshold is the strength of electromagnetic waves with which information can be normally sent and received between the POS terminal 10 and the mobile router 60. The predetermined area can be changed by adjusting the strength of electromagnetic waves transmitting the SSID sent by the mobile router 60. Specifically, the predetermined area can be set to the site of the store S, an area having a radius of a few meters from the POS terminal 10 that is the area in which the serviceperson provides maintenance, and the like.

The connection destination sensing section 117 in the maintenance mode determines whether or not the strength of electromagnetic waves transmitting the SSID received from the mobile router 60, which is a new connection destination, is greater than or equal to the threshold. The connection destination sensing section 117 determines the mobile router 60 not to be present in the predetermined area in a case where the strength of electromagnetic waves is smaller than the threshold. Meanwhile, the connection destination sensing section 117 determines whether or not the received SSID is the same as the SSID of the SSID storage region 122 in a case where the strength of electromagnetic waves is greater than or equal to the threshold. The connection destination sensing section 117 determines that the mobile router 60 is not in the predetermined area when the received SSID is different from the SSID of the SSID storage region 122. Meanwhile, the connection destination sensing section 117 determines that the mobile router 60 is present in the predetermined area when the received SSID is the same as the SSID of the SSID storage region 122.

The connection destination changing section 118 changes the connection destination to which the POS terminal 10 is connected. The connection destination changing section 118, which is a changing section changes the connection destination with which the communication control section 116 communicates from the access point 30 to the mobile router 60 when the connection destination sensing unit 117 senses the mobile router 60. That is, the connection destination changing section 118 changes the SSID of the connection destination setting 121 to the SSID stored in the SSID storage region 122.

Specifically, the connection destination changing section 118 sends a password (passcode) of the POS terminal 10 to the communication control section 116 when the connection destination sensing section 117 senses the mobile router 60. The password is predetermined information for authentication of whether or not the POS terminal 10 that sends the password is a correct POS terminal 10. The connection destination changing section 118 may send to the communication control section 116 a password that is stored in advance in the storage unit 12 or may require input of a password on all occasions. The present embodiment will be illustratively described in a case where the password is stored in advance in the storage unit 12. The connection destination changing section 118 changes the SSID of the connection destination setting 121 to the SSID stored in the SSID storage region 122 when the communication control section 116 receives an authentication notification indicating a positive authentication. Accordingly, the connection destination changing section 118 changes the connection destination to the mobile router 60, which is a new connection destination.

The connection destination changing section 118 changes the connection destination with which the communication control section 116 communicates from the mobile router 60 to the access point 30 in the normal mode after the end of maintenance performed by the serviceperson. That is, the connection destination changing section 118 changes the SSID of the connection destination setting 121 to the SSID assigned to the POS terminal 10 in the SSID assignment table T3.

The connection destination changing section 118 changes the SSID not when the log monitoring section 112 detects the predetermined character string, but when the connection destination sensing section 117 senses the mobile router 60. Accordingly, the connection destination changing section 118 can be connected to the access point 30 when the serviceperson does not perform maintenance.

The connection destination sensing section 117 in the normal mode does not sense the mobile router 60 even when the strength of electromagnetic waves transmitting the SSID received from the mobile router 60 carried by the serviceperson is greater than or equal to the threshold. Therefore, the connection destination changing section 118 does not change the connection destination setting 121. That is, the connection destination changing section 118 in the normal mode does not connect the POS terminal 10 and the mobile router 60 carried by the serviceperson. Therefore, the connection destination changing section 118 can prevent unintentional connection to the mobile router 60 carried by the serviceperson.

The output cause sensing section 119 senses the cause that triggers the log collection section 113 to output collection target logs stored in the collected log storage region 123. More specifically, the connection destination changing section 118 changes the connection destination to the mobile router 60 when the connection destination sensing section 117 senses the mobile router 60 having the same SSID as the SSID of the SSID storage region 122. As a result, the communication control section 116 is connected to the mobile router 60, which is the connection destination changed by the connection destination changing section 118, and sends the collection target log to the maintenance server 40. At this point, the output cause sensing section 119 senses connection of the communication control section 116 to the mobile router 60 as the cause to trigger the output of the collection target logs. As a result, the communication control section 116 is caused to automatically start sending the collection target logs stored in the collected log storage region 123 via the mobile router 60 sensed by the output cause sensing section 119.

Figure 10:
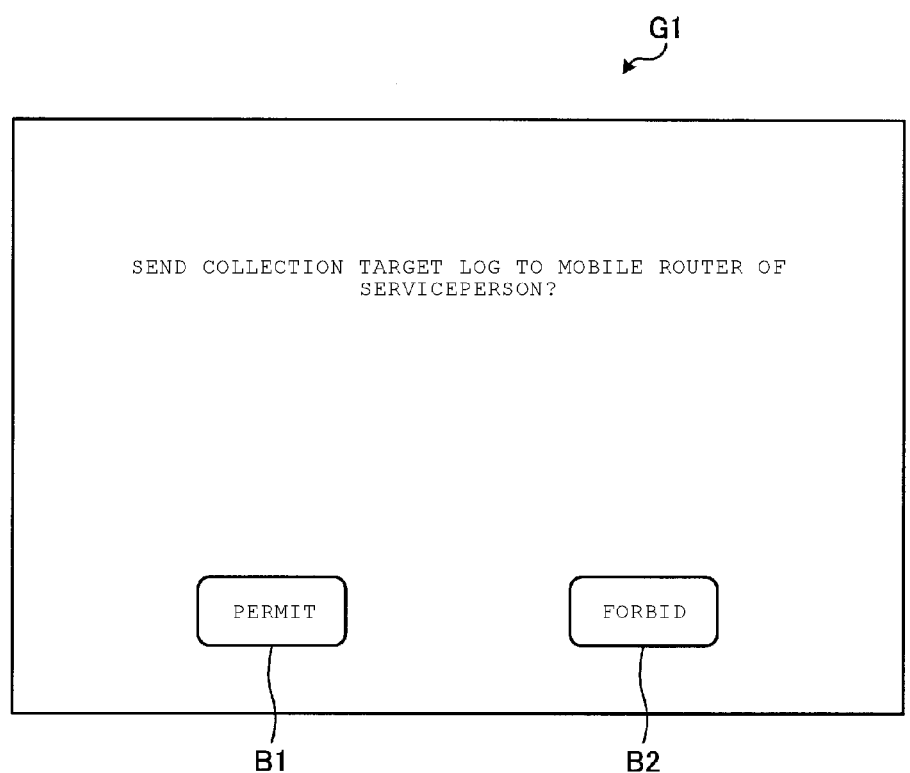
FIG. 10 illustrates an example of a send confirmation screen.

The cause to trigger the output of the collection target logs may be an operation of sending the collection target logs. In this case, the output cause sensing section 119 senses, as the cause to trigger the output of the collection targets log, an operation that is performed on a send confirmation screen by a user to send the collection target logs. FIG. 10 illustrates a send confirmation screen G1. On the send confirmation screen G1, a selection as to whether or not to permit changing of the mode is input. The send confirmation screen G1 displays a message such as "Send collection target log to mobile router of serviceman?" Through the message, the send confirmation screen G1 requests the user to permit the output of the collection target logs. The output cause sensing section 119 senses, as the cause to trigger the output of the collection target logs, an operation that presses a permit button B1. Meanwhile, the output cause sensing section 119 senses, as an operation to forbid the output of the collection target log, an operation that presses a forbid button B2.

Next, functional sections of the store server 20 will be described.

The CPU of the control unit 21 loads the log collection program PR2 of the storage unit 22 into the RAM and operates in accordance with the log collection program PR2, thereby generating each functional section illustrated in FIG. 9 on the RAM. Specifically, the control unit 21 includes, as the functional sections, a first communication control section 211 and a second communication control section 212.

The first communication control section 211 controls communication to the network N2. For example, the first communication control section 211 receives the SSID of the mobile router 60 carried by the serviceperson from the maintenance server 40.

The second communication control section 212 controls communication to the in-store network N1. For example, the second communication control section 212 receives a detection notification of a defined character string from the POS terminal 10. The second communication control section 212 sends the SSID received by the first communication control section 211 to the POS terminal 10 that sent the detection notification.

Next, functional sections of the maintenance server 40 will be described.

The CPU of the control unit 41 loads the log collection program PR3 of the storage unit 42 into the RAM and operates in accordance with the log collection program PR3, thereby generating each functional section illustrated in FIG. 9 on the RAM. Specifically, the control unit 41 includes, as the functional sections, a communication control section 411 and a storage control section 412.

The communication control section 411 controls communication to the network N2. Specifically, the communication control section 411 controls communication to the store server 20, the serviceperson's terminal 50, and the mobile router 60. Specifically, the communication control section 411 receives store visitor information from the serviceperson's terminal 50. The store visitor information includes information of the store S visited by the serviceperson and a signal having the SSID of the mobile router 60 carried by the serviceperson. The communication control section 411 sends the SSID included in the store visitor information received from the serviceperson's terminal 50 to the store server 20 of the store S. The communication control section 411 receives the collection target log from the mobile router 60.

The storage control section 412 stores the SSID included in the store visitor information received from the serviceperson's terminal 50 in the storage unit 42 as the SSID of the mobile router 60 carried by the serviceperson.

Next, functional sections of the mobile router 60 will be described.

The CPU of the control unit 61 loads the log collection program PR4 of the storage unit 62 into the RAM and operates in accordance with the log collection program PR4, thereby generating each functional section illustrated in FIG. 9 on the RAM. Specifically, the control unit 61 includes, as the functional sections, a first communication control section 611, a second communication control section 612, and an authentication control section 613.

The first communication control section 611 controls communication to the network N2. For example, the first communication control section 611 sends the collection target log to the maintenance server 40.

The second communication control section 612 controls communication to the POS terminal 10. For example, the second communication control section 612 sends the SSID of the mobile router 60 to the POS terminal 10 in order for the mobile router 60 to be detected. The second communication control section 612 is connected to the POS terminal 10 when the authentication control section 613 authenticates the POS terminal 10. The second communication control section 612 receives the collection target log sent from the POS terminal 10.

The authentication control section 613 authenticates the POS terminal 10 to be connected. Specifically, the authentication control unit 613 determines whether or not the password sent from the connection target POS terminal 10 is correct. The authentication control section 613 authenticates the POS terminal 10 that sends the password, when the password sent from the connection target POS terminal 10 is determined to be correct. Meanwhile, the authentication control section 613 does not authenticate the POS terminal 10 that sent the password, when the password sent from the connection target POS terminal 10 is determined to be incorrect.

Figure 11:
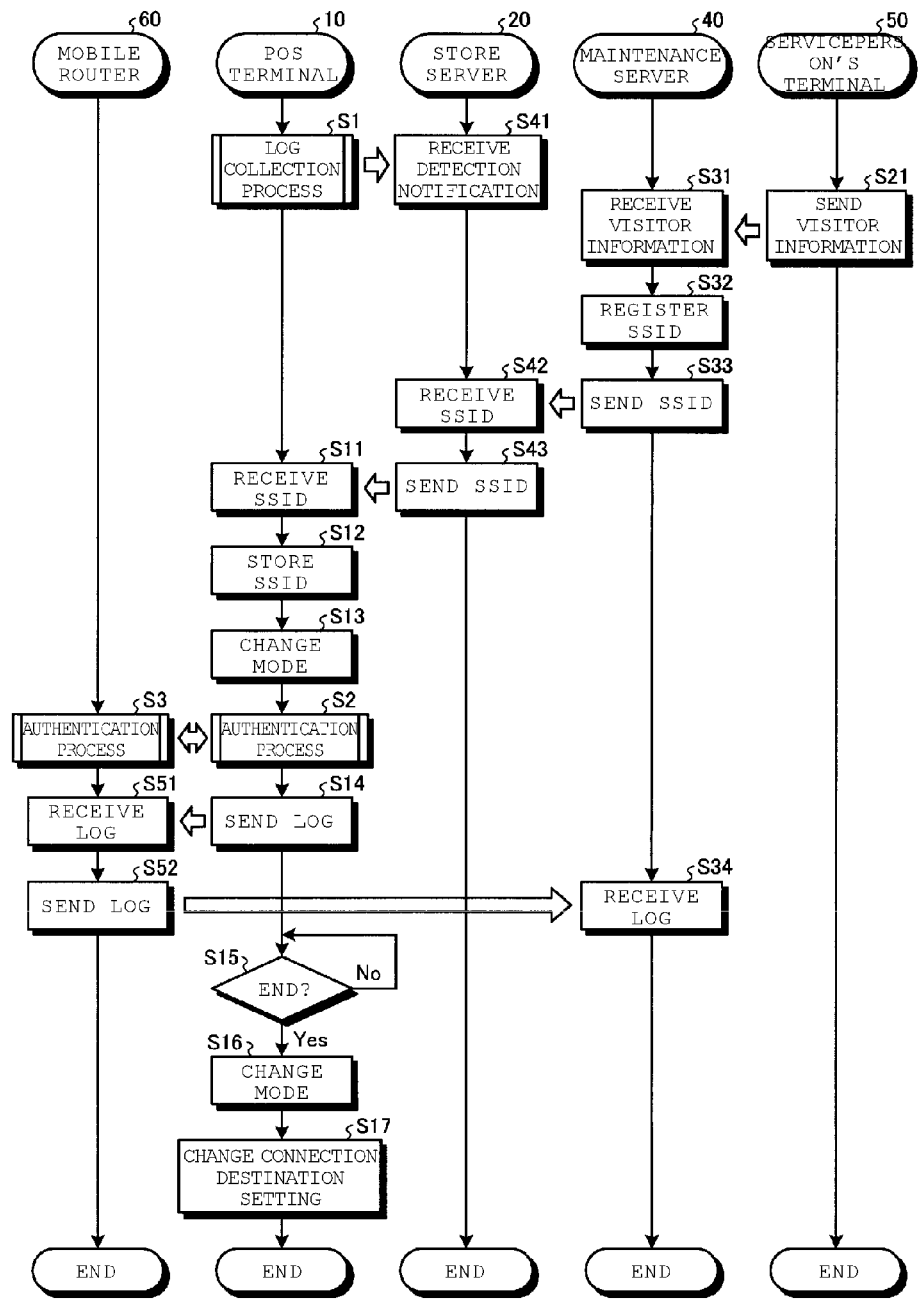
FIG. 11 is a flowchart illustrating a connection process.

Next, a connection process performed by the apparatus management system 1 will be described. In the connection process, the POS terminal 10 is connected to the mobile router 60 carried by the serviceperson in the maintenance mode. FIG. 11 is a flowchart illustrating one example of the connection process performed by the apparatus management system 1 according to the embodiment.

Figure 12:
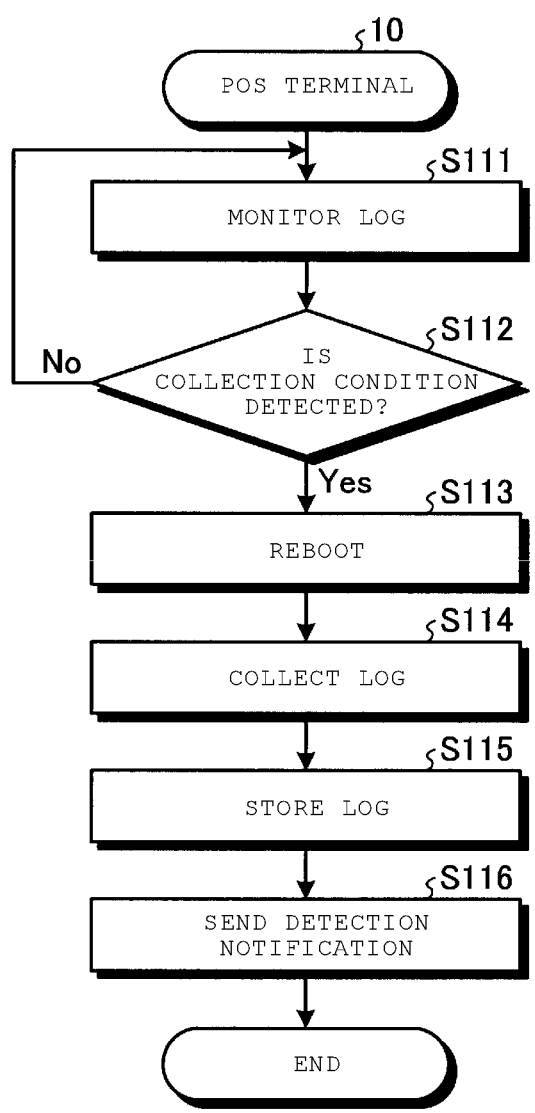
FIG. 12 is a flowchart illustrating a log collection process.

First, the POS terminal 10 performs a log collection process (Step S1). In the log collection process, a collection target log is collected if the log monitoring section 112 detects the predetermined character string of a log. FIG. 12 is a flowchart illustrating one example of the log collection process performed by the POS terminal 10 according to the embodiment.

First, the log monitoring section 112 of the POS terminal 10 monitors a monitoring target log registered in the collection condition table T1 (Step S111).

Next, the log monitoring section 112 of the POS terminal 10 determines whether or not the predetermined character string correlated with the monitoring target log in the collection condition table T1 is detected from the monitoring target log (Step S112). The log monitoring section 112 of the POS terminal 10 transitions to Step S111 if the predetermined character string is not detected from the monitoring target log (No in Step S112).

Meanwhile, the rebooting section 114 of the POS terminal 10 reboots the POS terminal 10 (Step S113) if the predetermined character string is detected from the monitoring target log (Yes in Step S112). Accordingly, the rebooting section 114 can restore the POS terminal 10 and collect the monitoring target log if the POS terminal 10 is hung by a failure and the like.

Next, the log collection section 113 of the POS terminal 10 collects a collection target log correlated with the detected predetermined character string of the monitoring target log in the collected log table T2 (Step S114).

Next, the log collection section 113 of the POS terminal 10 stores the collected collection target log in the storage unit 12 (Step S115). The communication control section 116 of the POS terminal 10 sends a detection notification of the predetermined character string to the store server 20 (Step S116).

Returning to FIG. 11, the second communication control section 212 of the store server 20 receives the detection notification of the predetermined character string from the POS terminal 10 (Step S41).

A staff member of the store S, if an alert indicating the detection of the predetermined character string and occurrence of a failure are displayed on the first display unit 14*a* and the like of the POS terminal 10, contacts the serviceperson in response to the alert.

Next, the serviceperson's terminal 50 sends to the maintenance server 40 the store visitor information that is input into the serviceperson's terminal 50 by the contacted serviceperson (Step S21).

Next, the maintenance server 40 receives the store visitor information sent from the serviceperson's terminal 50 (Step S31). Next, the maintenance server 40 registers the SSID included in the received store visitor information (Step S32). Next, the maintenance server 40 sends the registered SSID to the store server 20 of the store S designated in the store visitor information (Step S33).

Next, the first communication control section 211 of the store server 20 receives the SSID sent from the maintenance server 40 (Step S42). Next, the second communication control section 212 of the store server 20 sends the received SSID to the POS terminal 10 that sends the detection notification (Step S43).

Next, the communication control section 116 of the POS terminal 10 receives the SSID sent from the store server 20 (Step S11). Next, the communication control section 116 of the POS terminal 10 stores the received SSID in the SSID storage region 122 (Step S12). Next, the mode control section 115 of the POS terminal 10 changes the normal mode to the maintenance mode (Step S13).

Figure 13:
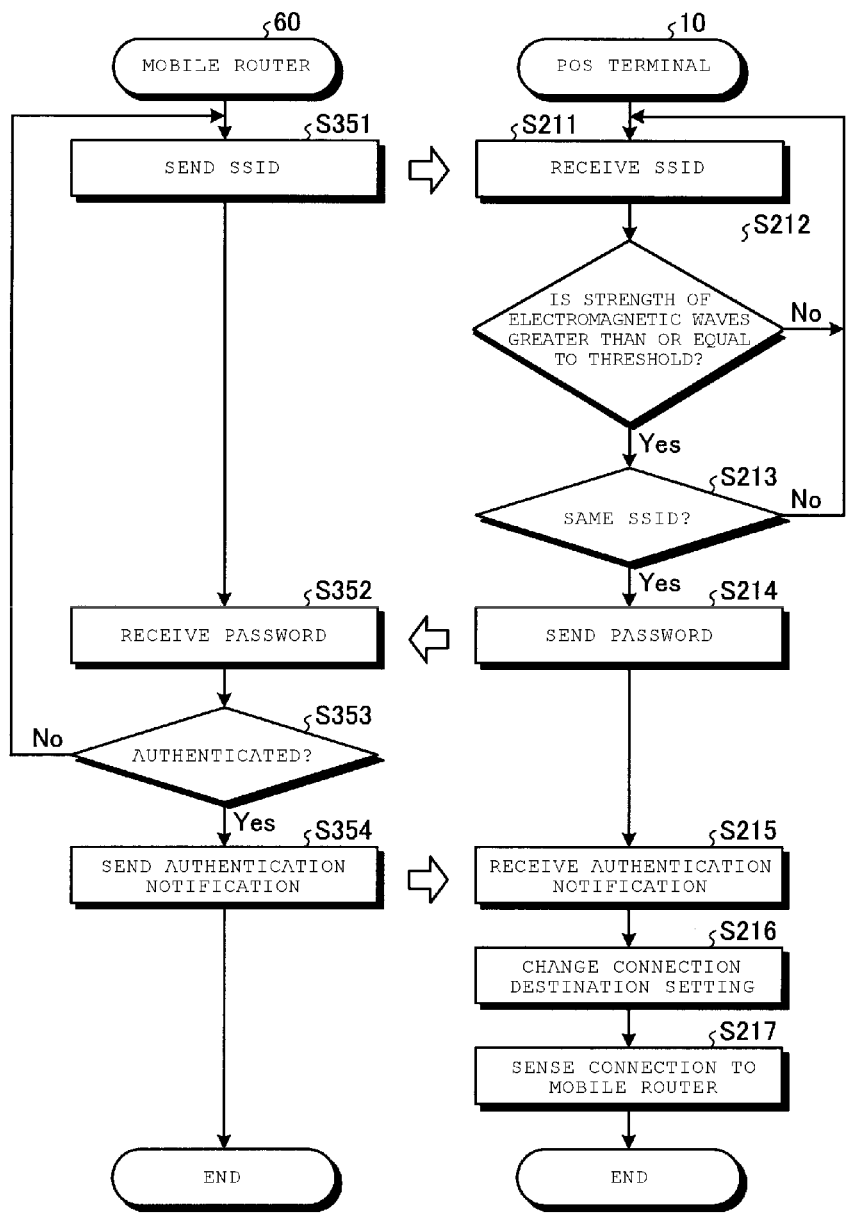
FIG. 13 is a flowchart illustrating an authentication process.

Next, the POS terminal 10 and the mobile router 60 perform an authentication process (Step S2 and Step S3). In the authentication process, the mobile router 60 carried by the serviceperson authenticates the POS terminal 10 and is connected to the POS terminal 10. FIG. 13 is a flowchart illustrating one example of the authentication process performed by the POS terminal 10 and the mobile router 60 according to the present embodiment. The flowchart illustrated in FIG. 13 assumes that the serviceperson visits the store S and boots the mobile router 60.

First, the second communication control section 612 of the mobile router 60 sends the SSID of the mobile router 60 to the POS terminal 10 (Step S351).

Next, the communication control section 116 of the POS terminal 10 receives the SSID sent from the mobile router 60 (Step S211). Next, the connection destination sensing section 117 of the POS terminal 10 determines whether or not the strength of electromagnetic waves transmitting the SSID is greater than or equal to the threshold (Step S212). The connection destination sensing section 117 of the POS terminal 10, if the strength of electromagnetic waves is smaller than the threshold (No in Step S212), determines that it is uncertain whether or not the mobile router 60 is the same as the mobile router 60 registered in the SSID storage region 122, and proceeds to Step S211.

Meanwhile, the connection destination sensing section 117 of the POS terminal 10, if the strength of electromagnetic waves is greater than or equal to the threshold (Yes in Step S212), determines whether or not the received SSID is the same as the SSID stored in the SSID storage region 122 (Step S213). The connection destination sensing section 117 of the POS terminal 10, if the SSIDs are different from each other (No in Step S213), determines that the mobile router 60 is not the mobile router 60 registered in the SSID storage region 122 and proceeds to Step S211.

Meanwhile, the communication control section 116 of the POS terminal 10, if the SSIDs are the same (Yes in Step S213), sends the password for authenticating the POS terminal 10 (Step S214). As described above, in the present embodiment, it is assumed that the password is stored in advance in the storage unit 12.

The second communication control section 612 of the mobile router 60 receives the sent password (Step S352). Next, the authentication control section 613 of the mobile router 60 determines whether or not the POS terminal 10 can be authenticated (Step S353). The authentication control section 613 of the mobile router 60 proceeds to Step S351 if the POS terminal 10 is not authenticated (No in Step S353).

Meanwhile, the authentication control section 613 of the mobile router 60, if the POS terminal 10 is authenticated (Yes in Step S353), sends an authentication notification indicating that the POS terminal 10 is authenticated (Step S354).

Next, the communication control section 116 of the POS terminal 10 receives the authentication notification (Step S215). Next, the SSID of the connection destination setting 121 of the POS terminal 10 is changed to the SSID stored in the SSID storage region 122 (Step S216). Accordingly, the connection destination changing section 118 of the POS terminal 10 changes the connection destination to the mobile router 60. Next, the output cause sensing section 119 of the POS terminal 10 senses connection to the mobile router 60 (Step S216).

The POS terminal 10 and the mobile router 60 end the authentication process described heretofore.

Returning to FIG. 11, the communication control section 116 of the POS terminal 10 sends a log stored in the collected log storage region 123 to the mobile router 60 using a wireless LAN in the log collection process (Step S14).

Next, the mobile router 60 receives the log sent from the POS terminal 10 (Step S51). Next, the mobile router 60 sends the log sent from the POS terminal 10 to the maintenance server 40 using a wireless WAN (Step S52).

The maintenance server 40 receives the log sent from the mobile router 60 (Step S34).

Next, the mode control section 115 of the POS terminal 10 determines whether or not sending of the log ended (Step S15). The connection destination changing section 118 of the POS terminal 10 waits and does not change the mode of the POS terminal 10 if the sending of the log has not ended (No in Step S15).

Meanwhile, the connection destination changing section 118 of the POS terminal 10 changes the maintenance mode to the normal mode (Step S16) if the sending of the log ended (Yes in Step S15).

Next, the mode control section 115 of the POS terminal 10 changes the SSID of the connection destination setting 121 to the SSID assigned to the POS terminal 10 in the SSID assignment table T3 (Step S17).

The POS terminal 10 ends the connection process described heretofore.

As described heretofore, according to the POS terminal 10 according to the present embodiment, the log monitoring section 112 monitors whether or not a predetermined character string is detected from a predetermined monitoring target log in the collection condition table T1. The log collection unit 113, if the log monitoring unit 112 detects the predetermined character string, collects a collection target log correlated with the monitoring target log and the predetermined character string in the collected log table T2 and stores the collection target log in the collected log storage region 123. The communication control section 116 sends the collection target log stored in the collected log storage region 123 to the maintenance server 40 if the output cause sensing section 119 senses connection to the mobile router 60 as the cause to trigger the output of the collection target log. Therefore, the POS terminal 10 according to the present embodiment can prevent failure to collect logs that need to be collected for analysis. Furthermore, since the serviceperson does not have to manually collect the collection target logs, the amount of time for the serviceperson to collect the logs in the store can be reduced.

The POS terminal 10 is described in the above embodiment as receiving the SSID of the mobile router 60 carried by the serviceperson from the store server 20. However, the SSID may be stored in advance in the SSID storage region 122 if the SSID of the mobile router 60 carried by the serviceperson is determined in advance. In this case, the connection destination changing section 118 changes the SSID of the connection destination setting 121 to the SSID that is registered in advance in the SSID storage region 122.

The POS terminal 10 according to the above embodiment outputs the collection target logs stored in the collected log storage region 123 to the maintenance server 40 via the mobile router 60. However, the POS terminal 10 may output the collection target logs using other methods. For example, the POS terminal 10 may output the collection target logs if a storage medium such as a Universal Serial Bus (USB) memory is connected to a USB port (not illustrated). In this case, the output cause sensing section 119 senses connection to the USB memory as the cause to trigger the output of the collection target logs. The communication control section 116 outputs the collection target logs stored in the collected log storage region 123 to the USB memory.

The programs executed in each apparatus according to the above embodiment and the modification examples are provided by being included in advance in the storage medium (ROM or storage unit) included in each apparatus but are not limited thereto. For example, the programs may be provided by being recorded in a computer-readable recording medium such as a CD-ROM, a flexible disk (FD), a CD-R, or a digital versatile disk (DVD) as files in an installable format or an executable format. The storage medium is not limited to a separate medium from a computer or an included system and also includes a storage medium in which the programs transferred by using a LAN, the Internet, and the like are downloaded and stored or temporarily stored.

The programs executed in each apparatus according to the above embodiment and the modification examples may be provided by being stored in a computer connected to a network such as the Internet and being downloaded via the network or may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computing device, comprising:
a memory;
a communication interface; and
a controller configured to
control switching between a normal mode of operation and a maintenance mode of operation,
store, in the memory, one or more logs that meet a predetermined condition, during normal mode of operation, and a network ID of a mobile router, and
while in the maintenance mode of operation, detect establishment of a local wireless or wired connection to the mobile router based on the stored network ID, detect a triggering event to trigger an output of said one or more logs stored in the memory, and upon detection of the triggering event, control the communication interface to transmit said one or more logs stored in the memory to the mobile router.

2. The computing device according to claim 1, wherein the triggering event includes establishment of the local wireless or wired connection to the mobile router.

3. The computing device according to claim 1, wherein the triggering event includes a user input granting permission to output said one or more logs stored in the memory.

4. The computing device according to claim 1, wherein the memory stores the network ID of the mobile router, in response to the communication interface receiving the network ID from a server that has an internet connection and is connected to the computing device through a local network, and
the local wireless connection is established when the computing device is within a communication range of the mobile router and a network ID received from the mobile router matches the network ID stored in the memory.

5. The computing device according to claim 4, wherein the local wireless connection with the mobile router is established only when the an intensity of a signal through which the network ID is received from the mobile router, is greater than a predetermined level.

6. The computing device according to claim 1, wherein the controller is further configured to detect a log trigger that triggers the storing of said one or more logs in the memory, and
said one or more logs are stored in the memory, in response to detection of the log trigger.

7. The computing device according to claim 6, wherein one or more logs that are determined to meet the predetermined condition during a predetermined period of time after the detection of the log trigger are stored in the memory.

8. A method for transmitting log information from a terminal device, comprising:
storing, in a memory, one or more logs that meet a predetermined condition during a normal mode of operation of the terminal device, and a network ID of a mobile router;
switching the terminal device to a maintenance mode of operation;
while operating the terminal device in the maintenance mode, detecting establishment of a local wireless or wired connection to the mobile router based on the stored network ID, detecting a triggering event to trigger an output of said one or more logs stored in the memory, and upon detection of the triggering event, transmitting said one or more logs stored in the memory to the mobile router.

9. The method according to claim 8, wherein the triggering event includes establishment of the local wireless or wired connection to the mobile router.

10. The method according to claim 8, wherein
the triggering event includes a user input granting permission to output said one or more logs stored in the memory.

11. The method according to claim 8, further comprising:
storing, in the memory, the network ID of the mobile router, in response to reception of the network ID from a server that has an internet connection and is connected to the terminal device through a local network, wherein
the local wireless connection is established when the terminal device is within a communication range of the mobile router and a network ID received from the mobile router matches the network ID stored in the memory.

12. The method according to claim 11, wherein
the local wireless connection with the mobile router is established only when the an intensity of a signal through which the network ID is received from the mobile router, is greater than a predetermined level.

13. The method according to claim 8, further comprising:
detecting a log trigger that triggers the storing of said one or more logs in the memory, wherein
said one or more logs are stored in the memory, in response to detection of the log trigger.

14. The method according to claim 13, wherein
one or more logs that are determined to meet the predetermined condition during a predetermined period of time after the detection of the log trigger are stored in the memory.

15. A non-transitory computer readable medium comprising a program that is executable in a terminal device to cause the terminal device to perform a method for transmitting log information, the method comprising:
storing, in a memory, one or more logs that meet a predetermined condition during a normal mode of operation of the terminal device, and a network ID of a mobile router;
switching the terminal device to a maintenance mode of operation;
while operating the terminal device in the maintenance mode, detecting establishment of a local wireless or wired connection to the mobile router based on the stored network ID, detecting a triggering event to trigger an output of said one or more logs stored in the memory, and upon detection of the triggering event, transmitting said one or more logs stored in the memory to the mobile router.

16. The non-transitory computer readable medium according to claim 15, wherein
the triggering event includes establishment of the local wireless or wired connection to the mobile router.

17. The non-transitory computer readable medium according to claim 15, wherein
the triggering event includes a user input granting permission to output said one or more logs stored in the memory.

18. The non-transitory computer readable medium according to claim 15, wherein the method further comprises:
storing, in the memory, the network ID of the mobile router, in response to reception of the network ID from a server that has an internet connection and is connected to the terminal device through a local network, wherein
the local wireless connection is established when the terminal device is within a communication range of the mobile router and a network ID received from the mobile router matches the network ID stored in the memory.

19. The non-transitory computer readable medium according to claim 18, wherein
the local wireless connection with the mobile router is established only when the an intensity of a signal through which the network ID is received from the mobile router is greater than a predetermined level.

20. The non-transitory computer readable medium according to claim 15, wherein the method further comprises:
detecting a log trigger that triggers the storing of said one or more logs in the memory, wherein
said one or more logs are stored in the memory, in response to detection of the log trigger.

* * * * *